US012675596B2

(12) United States Patent
Kon et al.

(10) Patent No.: US 12,675,596 B2
(45) Date of Patent: Jul. 7, 2026

(54) SYSTEMS AND METHODS FOR SOURCE-INDEPENDENT QUANTUM POSITION VERIFICATION

(71) Applicant: JPMORGAN CHASE BANK, N.A., New York, NY (US)

(72) Inventors: Wen Yu Kon, Singapore (SG); Ignatius William Primaatmaja, Singapore (SG); Kaushik Chakraborty, Singapore (SG); Ci Wen Lim, Singapore (SG); Marco Pistoia, Amawalk, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 90 days.

(21) Appl. No.: 18/947,987

(22) Filed: Nov. 14, 2024

(65) Prior Publication Data

US 2026/0154441 A1 Jun. 4, 2026

(51) Int. Cl.
G06F 21/62 (2013.01)
H04L 9/08 (2006.01)
H04L 9/32 (2006.01)
(52) U.S. Cl.
CPC ........ G06F 21/6227 (2013.01); H04L 9/0852 (2013.01); H04L 9/3271 (2013.01)
(58) Field of Classification Search
CPC .. G06F 21/6227; H04L 9/0852; H04L 9/3271
See application file for complete search history.

(56) References Cited

U.S. PATENT DOCUMENTS

2012/0195597 A1* 8/2012 Malaney ............... H04W 12/10
398/115
2016/0359623 A1* 12/2016 Unruh ................... H04L 9/3271

OTHER PUBLICATIONS

Tomamichel, M. et al. "One-Sided Device-Independent QKD and Position-Based Cryptography From Monogamy Games" in: Advances in Cryptology—Eurocrypt 2013, May 26, 2013, Springer Berlin Heidelberg, pp. 609-625. (Year: 2013).*
Buhrman, H. et al. "Position-Based Quantum Cryptography: Impossibility and Constructions". Rev. ed. Aug. 12, 2011, arXiv.org, Cornell University Library, Ithaca, NY, XP80448689, arXiv:1009. 2490v4 [quant-ph], pp. 1-27 (Year: 2011).*
Unruh, D. "Quantum Position Verification in the Random Oracle Model" in: Advances in Cryptology—Crypto 2014, Part II, LNCS 8617, Aug. 17, 2014, Springer Berlin Heidelberg, pp. 1-18. (Year: 2014).*

* cited by examiner

*Primary Examiner* — Cheng-Feng Huang
(74) *Attorney, Agent, or Firm* — GREENBERG TRAURIG LLP

(57) ABSTRACT

A method may include: a first verifier receiving a request for position verification comprising a claimed position from a prover electronic device; the first verifier generating two first bitstrings and sending one of the bitstrings to a second verifier; the prover preparing two entangled quantum systems and sending one of the quantum systems to the first verifier; the first verifier measuring the first quantum system; each of the first verifier and the second verifier sending one of the bitstrings to the prover electronic device so that they arrive at the claimed position at the same time; the prover electronic device measuring the second quantum system and sending responses to the two verifiers with the measurement; the first verifier confirming that the responses were received within an expected time window and are valid.

20 Claims, 4 Drawing Sheets

SYSTEMS AND METHODS FOR SOURCE-INDEPENDENT QUANTUM POSITION VERIFICATION

BACKGROUND OF THE INVENTION

1. Field of the Invention

Embodiments relate to systems and methods for source-independent quantum position verification.

2. Description of the Related Art

The physical location, or position, of a party can serve as a useful credential that is difficult to impersonate. For instance, verifying that a server that one is communicating with is located within a data center allows one to confidently certify the identity of the server without having to pre-share any secrets. Moreover, position-based identification can provide anonymity, for instance allowing a client to be granted access to a server based on the location (e.g., within an office), without requiring the client to reveal his/her identity.

Without quantum communication, classical position verification or position-based key exchange protocol requires the assumption of the bounded retrieval model, which essentially acts as a limit to the amount of classical information the adversary can store. The use of quantum communication affords the protocol properties that are not achievable with classical communication alone.

Having a bound on the classical memory size is an impractical assumption today, where commercial devices such as hard drives can store data beyond terabyte sizes. Using quantum communication allows for the adversary to have unbounded classical memory, but requires them to have bounded quantum entanglement. Since quantum information cannot be easily stored, at least in the near-term, this assumption on bounded quantum storage is more reasonable.

While quantum position verification protocols have been developed, the current protocols face two major challenges regarding its implementation in practice: (1) requirement for quantum non-demolition measurement, and (2) requirement for good loss tolerance on the detectors.

SUMMARY OF THE INVENTION

Systems and methods for source-independent quantum position verification are disclosed. In one embodiment, a method may include: receiving, by a first verifier electronic device, a request for position verification comprising a claimed position from a prover electronic device; generating, by the first verifier electronic device, a first bitstring and a second bitstring; sending, by the first verifier electronic device, the first bitstring and the second bitstring to a second verifier electronic device; preparing, by the prover electronic device, a first quantum system and a second quantum system in an entangled state; sending, by the prover electronic device, the first quantum system to the first verifier electronic device, and keeping the second quantum system in quantum memory; computing, by the first verifier electronic device, a basis for the first quantum system using an evaluation function, the first bitstring, and the second bitstring; measuring, by the first verifier electronic device, the first quantum system using the basis, resulting in a first measurement outcome; sending, by the first verifier electronic device, the first bitstring to the prover electronic device, and sending, by the second verifier electronic device, the second bitstring to the prover electronic device, wherein the first bitstring and the second bitstring are sent to arrive at the claimed position at the same time; computing, by the prover electronic device, the basis using the evaluation function, the first bitstring, and the second bitstring and measuring the second quantum system using the basis, resulting in a second measurement outcome; sending, by the prover electronic device, a first response comprising the second measurement outcome to the first verifier electronic device, and a second response comprising the second measurement outcome to the second verifier electronic device; confirming, by the first verifier electronic device and the second verifier electronic device, that the first response and the second response were received within an expected time window, wherein the expected time window is based on the claimed position of the prover electronic device; and rejecting, by the first verifier electronic device, the request in response to the first response or the second response being invalid or the first response and the second response being received outside of the expected time window.

In one embodiment, the first response or the second response is invalid in response to a score or an error rate being outside of a tolerance value.

In one embodiment, the method may also include publicly sharing, by the first verifier electronic device, the evaluation function with the prover electronic device.

In one embodiment, the first quantum system and the second quantum system are prepared in a Bell state.

In one embodiment, a source of the first quantum system and the second quantum system may include a spontaneous parametric down-conversion.

In one embodiment, the quantum memory may include a delay line.

In one embodiment, the expected time window may be configurable based on a desired security level.

According to another embodiment, a system may include: a first verifier electronic device; a second verifier electronic device; and a prover electronic device. The prover electronic device is configured to send a request for position verification comprising a claimed position to the first verifier electronic device; the first verifier electronic device is configured to generate a first bitstring and a second bitstring; the first verifier electronic device is configured to send the first bitstring and the second bitstring to a second verifier electronic device; the prover electronic device is configured to prepare a first quantum system and a second quantum system in an entangled state; the prover electronic device is configured to send the first quantum system to the first verifier electronic device, and to keep the second quantum system in quantum memory; the first verifier electronic device is configured to compute a basis for the first quantum system using an evaluation function, the first bitstring, and the second bitstring; the first verifier electronic device is configured to measure the first quantum system using the basis, resulting in a first measurement outcome; the first verifier electronic device is configured to send the first bitstring to the prover electronic device; the second verifier electronic device is configured to send the second bitstring to the prover electronic device, wherein the first bitstring and the second bitstring are sent to arrive at the claimed position at the same time; the prover electronic device is configured to compute the basis using the evaluation function, the first bitstring, and the second bitstring; the prover electronic device is configured to measure the second quantum system using the basis, resulting in a second measurement outcome; the prover electronic device is configured to send a first response comprising the second measurement outcome to the first verifier electronic device, and a second response comprising the second measurement outcome to the second verifier electronic device; the first verifier electronic device and the second verifier electronic device are configured to confirm that the first response and the second response were received within an expected time window, wherein the expected time window is based on the claimed position of the prover electronic device; and the first verifier electronic device is configured to reject the request in response to the first response or the second response being invalid or the first response and the second response being received outside of the expected time window.

In one embodiment, the first response or the second response is invalid in response to a score or an error rate being outside of a tolerance value.

In one embodiment, the first verifier electronic device may be configured to publicly share the evaluation function with the prover electronic device.

In one embodiment, the first quantum system and the second quantum system are prepared in a Bell state.

In one embodiment, the system may further include a spontaneous parametric down-conversion source of the first quantum system and the second quantum system.

In one embodiment, the quantum memory may include a delay line.

In one embodiment, the expected time window may be based on a desired security level.

According to another embodiment, a non-transitory computer readable storage medium may include instructions stored thereon, which when read and executed by one or more computer processors, cause the one or more computer processors to perform steps comprising: receiving a request for position verification comprising a claimed position from a prover electronic device; generating a first bitstring and a second bitstring; sending the first bitstring and the second bitstring to a second verifier electronic device; receiving a first quantum system from the prover electronic device, wherein the first quantum system and a second quantum system were prepared in an entangled state; computing a basis for the first quantum system using an evaluation function, the first bitstring, and the second bitstring; measuring the first quantum system using the basis, resulting in a first measurement outcome; sending the first bitstring to the prover electronic device, wherein the second verifier electronic device sends the second bitstring to the prover electronic device, and the first bitstring and the second bitstring are sent to arrive at the claimed position at the same time; receiving, from the prover electronic device, a first response comprising a second measurement outcome, wherein comprising the second measurement outcome may include a measurement of the second quantum system using the basis that was computed using the evaluation function, the first bitstring, and the second bitstring; confirming that the first response and a second response received by the second verifier electronic device were received within an expected time window, wherein the expected time window is based on the claimed position of the prover electronic device; and rejecting request in response to the first response or the second response being invalid or the first response and the second response being received outside of the expected time window.

In one embodiment, the first response or the second response is invalid in response to a score or an error rate being outside of a tolerance value.

In one embodiment, the non-transitory computer readable storage medium may also include instructions stored thereon, which when read and executed by the one or more computer processors, cause the one or more computer processors to perform steps comprising: publicly sharing the evaluation function with the prover electronic device.

In one embodiment, the first quantum system and the second quantum system are prepared in a Bell state.

In one embodiment, a source of the first quantum system and the second quantum system may include a spontaneous parametric down-conversion.

In one embodiment, the expected time window wherein the expected time window may be based on a desired security level.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate to systems and methods for source-independent quantum position verification.

In embodiments, quantum position verification may involve establishing an entangled quantum system between a prover, P, and a first verifier, $V_1$, and providing an indication to the first verifier, $V_1$, whether a quantum system is shared with the prover, P. Embodiments may establish this by having the prover, P, generate entangled quantum systems AQ and forward quantum system A to the first verifier $V_1$.

Figure 1:
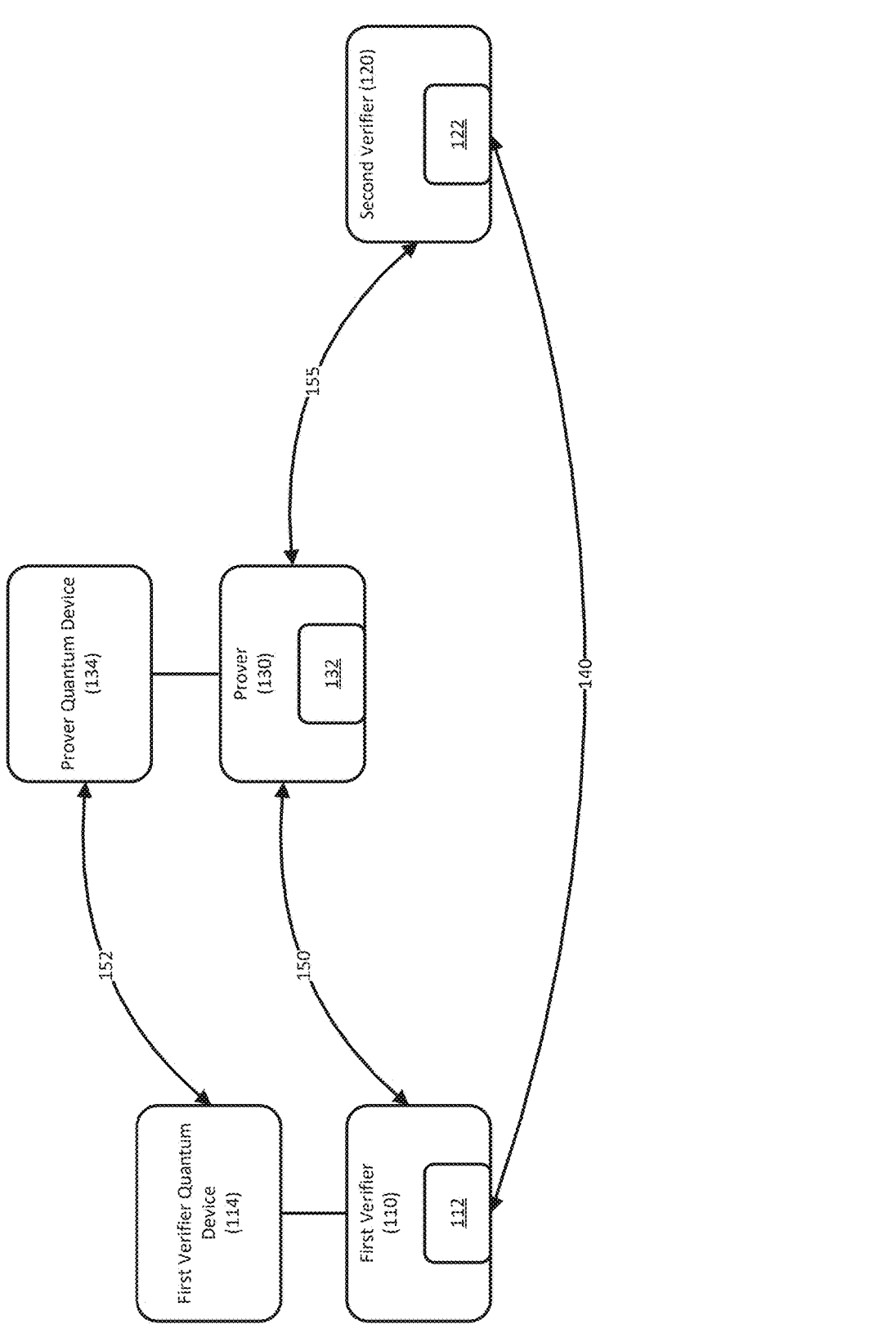
FIG. 1 illustrates a system for source-independent quantum position verification according to an embodiment.

Referring to FIG. 1, a system for quantum position-based key exchange is disclosed according to an embodiment. System 100 may include first verifier 110 and second verifier 120. In one embodiment, verifiers 110 and 120 may be electronic devices, such as servers, computers, etc. Verifiers 110 and 120 may be at known geographical locations, such as data centers or satellites.

First verifier 110 may execute first verifier computer program 112, and second verifier 120 may execute second verifier computer program 122.

First verifier 110 and second verifier 120 may communicate via secure private communication channel 140. For example, secure private communication channel 140 may include a fiber channel, a satellite link, a virtual private network (VPN), etc.

First verifier 110 may have access to first verifier quantum device 114, such as a BB84 measurement device.

Prover 130 may be a classical electronic device, such as a server, a computer, etc., that has access to prover quantum device 134. Prover 130 may seek to prove its location (i.e., location P) to first verifier 110 and second verifier 120. First verifier 110 and second verifier 120 may be substantially colinearly located.

Prover quantum device 134 may include an entanglement source, such as spontaneous parametric down conversion source, and a BB84 measurement device. Prover quantum device 134 may include quantum memory (not shown), such as a delay line.

Prover may execute prover computer program 132.

First verifier 110 and second verifier 120 may communicate with prover 130 using first communication channel 150 and second communication channel 155, respectively. First communication channel 150 and second communication channel 155 may be any suitable classical communication channel, preferably with low latency.

First communication channel 150 and second communication channel 155 may also support one-way authentication, where the prover is able to authenticate messages originating from first verifier 110 and second verifier 120 respectively.

First verifier quantum device 114 and prover quantum device 134 may communicate via third communication channel 152, which may be a communication channel that supports quantum communications, such as a direct fiber connection, a satellite link, etc.

Figure 2A:
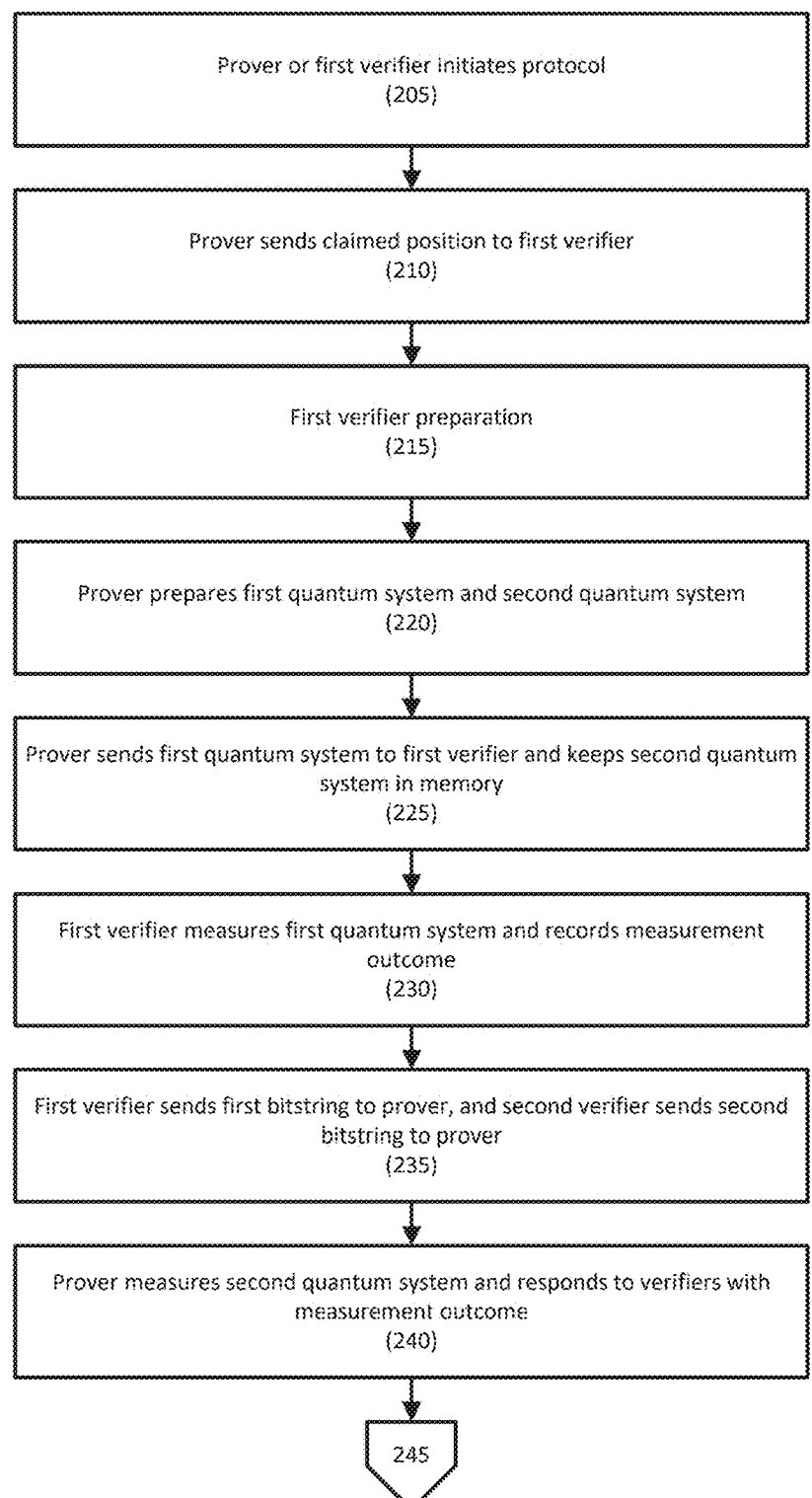
FIGS. 2A and 2B illustrate a method for source-independent quantum position verification according to an embodiment.
Figure 2B:
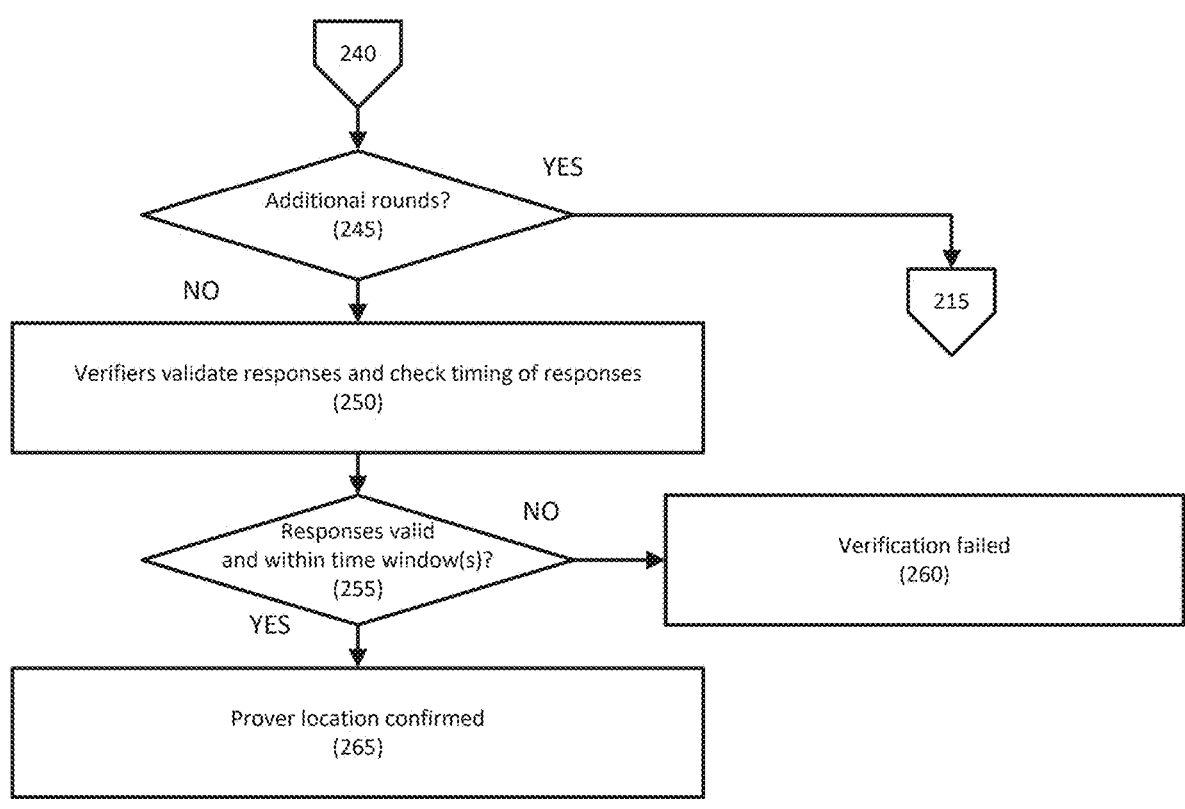

Referring to FIGS. 2A and 2B, a method for source-independent quantum position verification is disclosed according to an embodiment.

In step 205, a prover or a first verifier may initiate a quantum position verification-based protocol. For example, the initiating party may send a hello message from to the target party (e.g., from the prover to the first verifier) to begin the protocol, and the target party may respond with a hello message to indicate that it is ready to begin the protocol.

At the same time, the prover and verifiers may publicly share an evaluation function. An evaluation function may be a function that takes two bitstrings, x' and y', as inputs and outputs two bit values, θ and T, which are used as the basis choice and testing parameter respectively in the protocol. The evaluation function has the property that knowing only one of the input bitstrings is insufficient to guess the outputs accurately. Examples of evaluation functions include hash functions, inner product functions and random functions.

In step 210, the prover may send its claimed position, P, to the first verifier. The claimed position may be a position, or location, that the prover seeks to have verified by the verifiers.

In step 215, the first verifier may randomly generate two bitstrings, x' and y', as evaluation function inputs. The first verifier may send both bitstrings x' and y' to a second verifier using a secure communication channel.

The first verifier and the second verifier may agree on the timing to send the bitstrings x' and y' to the prover so that they arrive at the prover at the same time.

In step 220, the prover may prepare a first quantum system A and a second quantum system $Q$ in an entangled state, such as a Bell state. A quantum system is a system that behaves according to the principles of quantum mechanics. A quantum system can be prepared in a quantum state and its properties can be measured by a quantum measurement device. A quantum state has unique properties not observed in classical states, such as quantum superposition, interference, and entanglement.

A Bell state is one of four specific maximally entangled two-qubit state.

For example, the prover may use a spontaneous parametric down-conversion (SPDC) source, which may be a source of entangled quantum systems, to generate the quantum systems A and Q in an entangled state.

In step 225, the prover may send the first quantum system A to the first verifier, and may keep the second quantum system $Q$ in memory. For example, if the second quantum system Q is a photon, it may be stored in quantum memory, such as a delay line.

In step 230, the first verifier may measure the first quantum system and record the measurement outcome. For example, the first verifier may compute the basis θ=ƒ(x', y') using the evaluation function and the two bitstrings, and may measure the received quantum system A in the computed basis. In another embodiment, the first verifier may prepare a fixed or random basis for measuring quantum system A.

The basis describes the choice of the quantum measurement. For example, the quantum measurement of a quantum system with a polarization quantum state can be in the rectilinear basis, to determine if the polarization is horizontal or vertical, or in the circular basis, to determine if the polarization is left-circular or right-circular.

The first verifier may set a detection indicator, $b_{det}$, to 1 if the first quantum system is received (i.e., the measurement generates an outcome), may record a first measurement outcome z and the timing $t_{det}$. If the first quantum system is not received, the first verifier may set the detection indicator, $b_{det}$, to 0.

In step 235, the first verifier may send the first bitstring x' to the prover via a communication channel supporting one-way authentication, and the second verifier may send the second bitstring y' to the prover via a communication channel supporting one-way authentication, and both arrive at the claimed location at the same time.

In one embodiment, the first verifier may note any delay, Δ, if any, between the time of receiving quantum system A and sending message x'.

In step 240, the prover may measure the second quantum system and may respond to the verifiers with second measurement outcome z'. For example, the prover may compute the basis using the evaluation function and the two bitstrings, θ=ƒ(x', y'), and may measure the second quantum system $Q$ in computed basis θ. In another embodiment, the prover may prepare a fixed or random basis for measuring quantum system $Q$.

In one embodiment, the basis used by the first verifier and the prover may be the same type of basis.

If no detection is made (i.e., quantum system $Q$ is lost), the prover announces "no detection" immediately/quickly to both verifiers.

If a detection is made, the prover sends the second measurement outcome z' immediately/quickly to the first verifier and the second verifier in a first response and a second response, respectively.

In step 245, a check is made to see if additional rounds are needed. If so, the process may return to step 215. If there are no more additional rounds, in step 250, the first verifier and the second verifier may validate the responses and may check the timing of responses. For example, for every step of the protocol, the first verifier and the second verifier may verify (1) that the responses are valid, i.e., the responses received by both verifiers match, (2) the timings are valid (response received by each verifier are within a threshold time dependent on the distance between that verifier and the prover), (3) the delay Δ is within an expected time window, such as an acceptable range.

The acceptable range for the expected time window may be configurable and set by the user. In one embodiment, the acceptable range for the expected time window may depend on a desired level of security. For example, in embodiments, any positive delay in receiving the quantum system A may be acceptable. For weaker security levels with a negative delay (i.e., the first bitstring x' is sent from the first verifier to the prover before the first verifier has received quantum system A), then any delay such that the time quantum system A arrives at the first verifier is earlier than the time the second verifier's message reaches the first verifier may be acceptable.

In another example, the acceptable range may be set to ensure that the second quantum system Q exits the delay line just as the prover is ready to measure the second quantum system Q. This may be based on timings, such as time it takes to switch basis choice, compute the basis, etc.

Furthermore, the verifiers may compute and check if the overall score, or error rate is within a tolerance bounds, and the overall loss is within a tolerance value. In one embodiment, the score or error rate may be determined by comparing the first quantum measurement to the first response.

The tolerance value may be set by the user, may be dynamic, etc.

If, in step 255, any check fails, in step 260, the verification may fail. If all checks pass, in step 265, the verifiers can certify that the prover is at the claimed position P.

Figure 3:
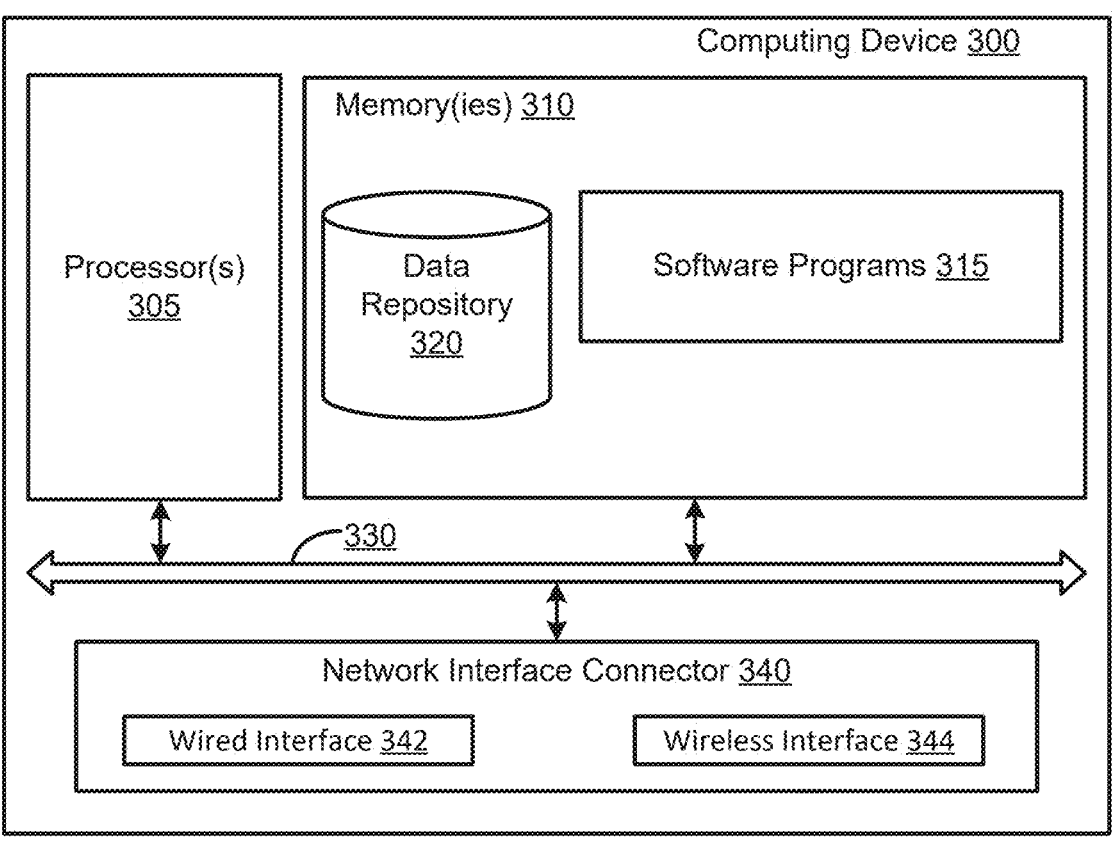
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

receiving, by a first verifier electronic device, a request for position verification comprising a claimed position from a prover electronic device;

generating, by the first verifier electronic device, a first bitstring and a second bitstring;

sending, by the first verifier electronic device, the first bitstring and the second bitstring to a second verifier electronic device;

preparing, by the prover electronic device, a first quantum system and a second quantum system in an entangled state;

sending, by the prover electronic device, the first quantum system to the first verifier electronic device, and keeping the second quantum system in quantum memory;

computing, by the first verifier electronic device, a basis for the first quantum system using an evaluation function, the first bitstring, and the second bitstring;

measuring, by the first verifier electronic device, the first quantum system using the basis, resulting in a first measurement outcome;

sending, by the first verifier electronic device, the first bitstring to the prover electronic device, and sending, by the second verifier electronic device, the second bitstring to the prover electronic device, wherein the first bitstring and the second bitstring are sent to arrive at the claimed position at the same time;

computing, by the prover electronic device, the basis using the evaluation function, the first bitstring, and the second bitstring and measuring the second quantum system using the basis, resulting in a second measurement outcome;

sending, by the prover electronic device, a first response comprising the second measurement outcome to the first verifier electronic device, and a second response comprising the second measurement outcome to the second verifier electronic device;

confirming, by the first verifier electronic device and the second verifier electronic device, that the first response and the second response were received within an expected time window, wherein the expected time window is based on the claimed position of the prover electronic device; and rejecting, by the first verifier electronic device, the request in response to the first response or the second response being invalid or the first response and the second response being received outside of the expected time window.

2. The method of claim 1, wherein the first response or the second response is invalid in response to a score or an error rate being outside of a tolerance value.

3. The method of claim 1, further comprising:

publicly sharing, by the first verifier electronic device, the evaluation function with the prover electronic device.

4. The method of claim 1, wherein the first quantum system and the second quantum system are prepared in a Bell state.

5. The method of claim 1, wherein a source of the first quantum system and the second quantum system comprises a spontaneous parametric down-conversion.

6. The method of claim 1, wherein the quantum memory comprises a delay line.

7. The method of claim 1, wherein the expected time window is configurable based on a desired security level.

8. A system, comprising:

one or more hardware processors;

a first verifier electronic device;

a second verifier electronic device; and a prover electronic device;

wherein:

the prover electronic device is configured to send a request for position verification comprising a claimed position to the first verifier electronic device;

the first verifier electronic device is configured to generate a first bitstring and a second bitstring;

the first verifier electronic device is configured to send the first bitstring and the second bitstring to a second verifier electronic device;

the prover electronic device is configured to prepare a first quantum system and a second quantum system in an entangled state;

the prover electronic device is configured to send the first quantum system to the first verifier electronic device, and to keep the second quantum system in quantum memory;

the first verifier electronic device is configured to compute a basis for the first quantum system using an evaluation function, the first bitstring, and the second bitstring;

the first verifier electronic device is configured to measure the first quantum system using the basis, resulting in a first measurement outcome;

the first verifier electronic device is configured to send the first bitstring to the prover electronic device;

the second verifier electronic device is configured to send the second bitstring to the prover electronic device, wherein the first bitstring and the second bitstring are sent to arrive at the claimed position at the same time;

the prover electronic device is configured to compute the basis using the evaluation function, the first bitstring, and the second bitstring;

the prover electronic device is configured to measure the second quantum system using the basis, resulting in a second measurement outcome;

the prover electronic device is configured to send a first response comprising the second measurement outcome to the first verifier electronic device, and a second response comprising the second measurement outcome to the second verifier electronic device;

the first verifier electronic device and the second verifier electronic device are configured to confirm that the first response and the second response were received within an expected time window, wherein the expected time window is based on the claimed position of the prover electronic device; and the first verifier electronic device is configured to reject the request in response to the first response or the second response being invalid or the first response and the second response being received outside of the expected time window.

9. The system of claim 8, wherein the first response or the second response is invalid in response to a score or an error rate being outside of a tolerance value.

10. The system of claim 8, wherein the first verifier electronic device is configured to publicly share the evaluation function with the prover electronic device.

11. The system of claim 8, wherein the first quantum system and the second quantum system are prepared in a Bell state.

12. The system of claim 8, further comprising:

a spontaneous parametric down-conversion source of the first quantum system and the second quantum system.

13. The system of claim 8, wherein the quantum memory comprises a delay line.

14. The system of claim 8, wherein the expected time window is based on a desired security level.

15. A non-transitory computer readable storage medium, including instructions stored thereon, which when read and executed by one or more computer processors, cause the one or more computer processors to perform steps comprising:

receiving a request for position verification comprising a claimed position from a prover electronic device;

generating a first bitstring and a second bitstring;

sending the first bitstring and the second bitstring to a second verifier electronic device;

receiving a first quantum system from the prover electronic device, wherein the first quantum system and a second quantum system were prepared in an entangled state;

computing a basis for the first quantum system using an evaluation function, the first bitstring, and the second bitstring;

measuring the first quantum system using the basis, resulting in a first measurement outcome;

sending the first bitstring to the prover electronic device, wherein the second verifier electronic device sends the second bitstring to the prover electronic device, and the first bitstring and the second bitstring are sent to arrive at the claimed position at the same time;

receiving, from the prover electronic device, a first response comprising a second measurement outcome, wherein comprising the second measurement outcome comprises a measurement of the second quantum system using the basis that was computed using the evaluation function, the first bitstring, and the second bitstring;

confirming that the first response and a second response received by the second verifier electronic device were received within an expected time window, wherein the expected time window is based on the claimed position of the prover electronic device; and rejecting request in response to the first response or the second response being invalid or the first response and the second response being received outside of the expected time window.

16. The non-transitory computer readable storage medium of claim 15, wherein the first response or the second response is invalid in response to a score or an error rate being outside of a tolerance value.

17. The non-transitory computer readable storage medium of claim 15, further including instructions stored thereon, which when read and executed by the one or more computer processors, cause the one or more computer processors to perform steps comprising:

publicly sharing the evaluation function with the prover electronic device.

18. The non-transitory computer readable storage medium of claim 15, wherein the first quantum system and the second quantum system are prepared in a Bell state.

19. The non-transitory computer readable storage medium of claim 15, wherein a source of the first quantum system and the second quantum system comprises a spontaneous parametric down-conversion.

20. The non-transitory computer readable storage medium of claim 15, wherein the expected time window wherein the expected time window is based on a desired security level.

* * * * *